(12) United States Patent
Brablec et al.

(10) Patent No.: US 6,418,198 B2
(45) Date of Patent: *Jul. 9, 2002

(54) APPARATUS AND METHOD FOR VERIFICATION OF THE PRESENCE OF A REMOTE USER

(75) Inventors: Milos Brablec, Skokie; Abhay Vikram Munshi, Rolling Meadows, both of IL (US)

(73) Assignee: 3Com Corporation, Rolling Meadows, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,343

(22) Filed: May 27, 1998

(51) Int. Cl.⁷ .................................................. H04M 1/64
(52) U.S. Cl. ............................ 379/79; 379/74; 379/77; 379/201.1
(58) Field of Search .............................. 379/80, 79, 81, 379/372, 67.1, 88.19, 88.2, 88.03, 88.02, 88.04, 70, 74, 77, 85, 201.1

(56) References Cited

U.S. PATENT DOCUMENTS

| | | | | |
|---|---|---|---|---|
| 3,962,546 A | | 6/1976 | Hashimoto | 379/28 |
| 4,314,103 A | * | 2/1982 | Wilson | 379/77 |
| 4,471,489 A | | 9/1984 | Konetski et al. | 375/222 |
| 4,885,763 A | * | 12/1989 | O'Brien et al. | 379/88.24 |
| 5,572,576 A | * | 11/1996 | Klausner et al. | 379/88.11 |
| 5,761,271 A | * | 6/1998 | Karnowski | 379/1.01 |
| 5,768,349 A | * | 6/1998 | Knuth et al. | 379/88.22 |
| 5,822,406 A | * | 10/1998 | Brown | 379/88.07 |
| 5,867,560 A | * | 2/1999 | Frankland | 379/81 |

* cited by examiner

*Primary Examiner*—Fan Tsang
*Assistant Examiner*—Ovidio Escalante
(74) *Attorney, Agent, or Firm*—Baniak Pine & Gannon

(57) ABSTRACT

A telephone answering apparatus for verification of the presence of a remote user includes a detector, and a controller operatively connected to the detector and to a timer, wherein the controller restarts the timer upon detection of a telephone signal from the remote user and terminates a telephone connection if the telephone signal is not detected within a set period of time.

11 Claims, 4 Drawing Sheets

APPARATUS AND METHOD FOR VERIFICATION OF THE PRESENCE OF A REMOTE USER

FIELD OF THE INVENTION

This invention relates generally to the field of automatic telephone answering systems and, in particular, to an apparatus for verifying the presence of a remote user.

BACKGROUND OF THE INVENTION

There are various types of systems which automatically answer an incoming call and maintain a telephone line connection which are broadly defined as automatic telephone answering systems. These systems include, for example, automatic telephone message recording equipment, message recording systems having remote access message playback, automatic telephone call forwarding equipment, automatic dial-up alarm receiving equipment, automatic answering data entry systems, and other telephone devices used in association with modem equipment.

In a typically operating sequence, a user may establish a remote telephone line connection with the telephone answering system. After the connection has been established, the user may, for example, initiate playback of a recorded message which is stored in the system. In some situations the user may decide to hang up before playback of the message ends. However, the telephone line connection may be maintained even after the user hangs up. This may result in telephone usage fees being charged to the user for a period of time after the user hangs up. This also may create inefficiencies in the telephone network system due to the fact that the originally assigned telephone line is occupied even though the user is no longer utilizing the telephone line connection.

Accordingly, it would be desirable to have a simple and cost effective apparatus for verifying the presence of a remote user that overcomes the disadvantages described above.

SUMMARY OF THE INVENTION

One aspect of the invention provides a telephone answering apparatus for verification of the presence of a remote user including a detector, and a controller operatively connected to the detector and to a timer, wherein the controller restarts the timer upon detection of a telephone signal from a remote user and terminates a telephone connection if the telephone signal is not detected within a set period of time. The telephone signal may preferably be any audio signal such as, for example, a Dual Tone Multi Frequency signal, and the detector may preferably be a telephone signal detector. An audio player may preferably be operatively connected to the controller. A 2-wire to 4-wire network circuit may preferably connected to the detector and a switch may preferably be operatively connected to the 2-wire to 4-wire network circuit.

Another aspect of the invention provides a method of verifying the presence of a remote user. A timer, a detector, and a controller are provided. A telephone connection between a remote user and a telephone answering apparatus is established. A timer sequence is initiated, and at least one telephone signal from the remote user is detected. The timer sequence is restarted in response to the detection of the at least one telephone signal. The timer sequence ends and the telephone connection is terminated. The telephone signal may preferably be a Dual Tone Multi Frequency signal.

Another aspect of the invention provides a method of verifying the presence of a remote user. A timer, a detector, an audio player, and a controller are provided. A telephone line connection between a remote user and a telephone answering apparatus is established. A timer sequence is initiated and a message is played. At least one telephone signal from the remote user is detected. The timer sequence is restarted in response to the detection of the at least one telephone signal. The timer sequence ends, and the playing of the message is stopped. The telephone connection is terminated. The telephone signal may preferably be a Dual Tone Multi Frequency signal.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
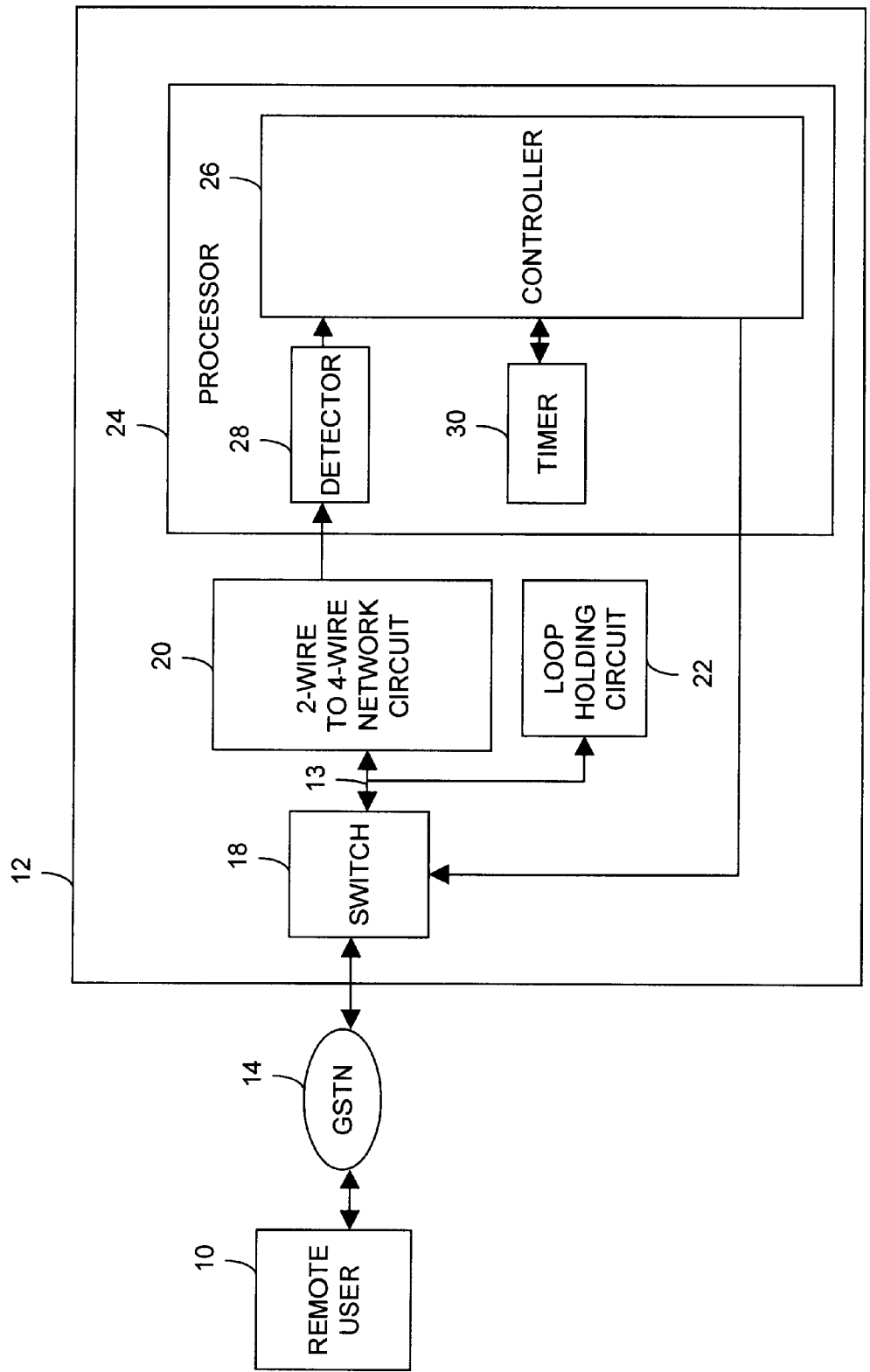
FIG. 1 is a block diagram of a preferred embodiment of a telephone answering apparatus in accordance with the invention.

As shown in FIG. 1, a remote user 10 may establish a telephone line connection to a telephone answering apparatus 12 through a General Switched Telephone Network (GSTN) 14. The telephone answering apparatus 12 designates a period of time for the remote user 10 to send a telephone signal to the telephone answering apparatus 12 to allow the apparatus 12 to verify that the remote user 10 is still on-line. If the remote user 10 fails to send a telephone signal during this period of time, the telephone answering apparatus 12 will automatically terminate the connection to the remote user 10.

The telephone answering apparatus 12 includes a switch 18, a 2-wire to 4-wire network circuit 20, a loop holding circuit 22, and a processor 24. The processor 24 may be any of the commercially available processors. The processor 24 may preferably be a digital signal processor such as, for example, a TMS 320C52 manufactured by Texas Instruments Inc. In the embodiment shown, the processor 24 preferably executes software or firmware which functionally provides a controller 26, a detector 28 and a timer 30. One embodiment of the telephone answering apparatus 12 may preferably be the Sportster Message Plus supplied by 3Com Corporation.

Alternatively, the controller 26, detector 28, and timer 30 may be comprised of discrete circuits which may be operably connected to the processor 24. The controller 26 controls the various functions carried out by the telephone answering apparatus 12. In particular, the controller 26 initializes and controls the operation of the timer 30. The detector 28 detects telephone signals which are defined as any audio signal which is transferred through the GSTN 14. The telephone signals may include, for example, Dual Tone Multi Frequency (DTMF) signals which are generated when the remote user 10 presses one of the various keys on a telephone keypad such as, for example, a # key.

The switch 18 may be any of the commercially available switches including, for example, a relay switch or an electronic switch. As shown in FIG. 1, the switch 18 is operatively connected to the 2-wire to 4-wire network circuit 20 and the loop holding circuit 22. Upon activation of the switch 18, the loop holding circuit 22 drains current from the GSTN 14. Upon detection of the current drain by the GSTN 14, the GSTN 14 establishes a telephone connection to the telephone answering apparatus 12 thereby establishing a telephone connection between the remote user 10 and the telephone answering apparatus 12.

The 2-wire to 4-wire network circuit 20 functions to combine signals which are both transmitted and received by the processor 24 along telephone line 13. In the embodiment shown in FIG. 1, the 2-wire to 4-wire network circuit 20 routes telephone signals from the telephone line 13 to the detector 28.

In operation, the remote user 10 establishes a connection to the telephone answering apparatus 12 via the GSTN 14. The controller 26 starts the timer 30 which provides a period of time for the detector 28 to detect the presence of a telephone signal from the remote user 10. If the detector 28 detects a telephone signal from the remote user 10 during this period of time, the controller 26 restarts the timer 30. If a telephone signal from the remote user 10 is not detected within the time period, the controller 26 causes the switch 18 to disconnect the telephone connection between the telephone answering apparatus 12 and the GSTN 14 thereby disconnecting the telephone connection between the telephone answering apparatus 12 and the remote user 10.

Figure 2:
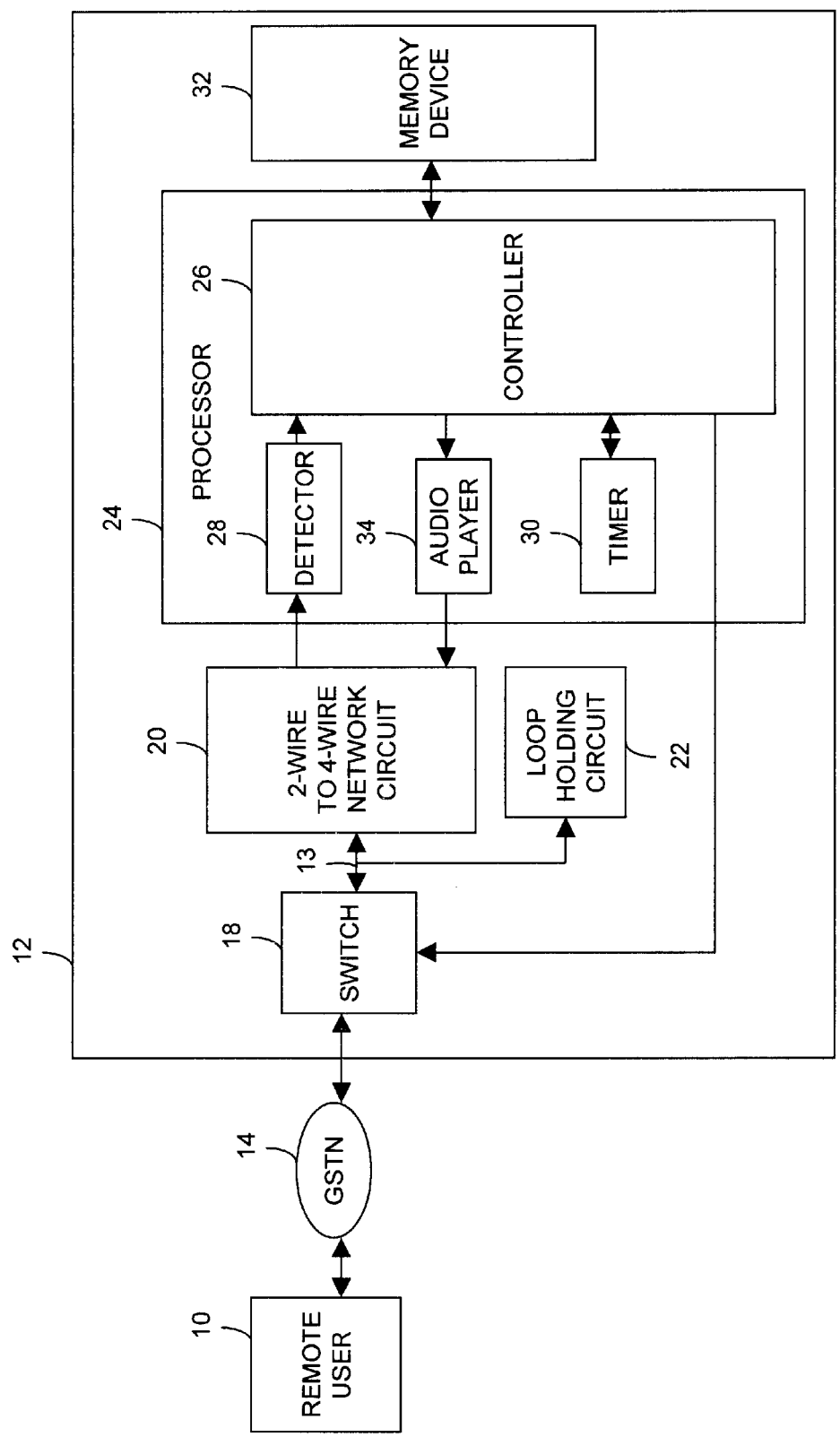
FIG. 2 is an alternative embodiment of the processor of FIG. 1 with a memory device.

FIG. 2 illustrates an alternative embodiment of a processor 24 of FIG. 1 with a memory device 32. The memory device 32 may be any of the commercially available memory devices such as, for example, an EEPROM (Electrically Erasable Programmable Read Only Memory), a SRAM (Static Random Access Memory) or Flash Memory suitable for storing audio data received by the telephone answering apparatus 12. As shown in FIG. 2, the processor 24 further includes an audio player 34. The audio player 34 converts audio data into an audio signal and plays the audio signal. The processor 24 may preferably executes software or firmware which functionally provides an audio player 34. Alternatively, the audio player 34 may be comprised of discrete circuits which may be operatively connected to the processor 24. The output of the audio player 34 is operatively connected to the 2-wire to 4-wire network circuit 20, which routes signals from the audio player 34 to the telephone line 13. In operation, if a user initiates playback of a message, the controller 24 retrieves audio data from the memory device 32 and transfers the audio data to the audio player 34. The audio player 34 converts the audio data into an audio signal which is then fed into the telephone line 13 via the 2-wire to 4-wire network circuit 18.

Figure 3:
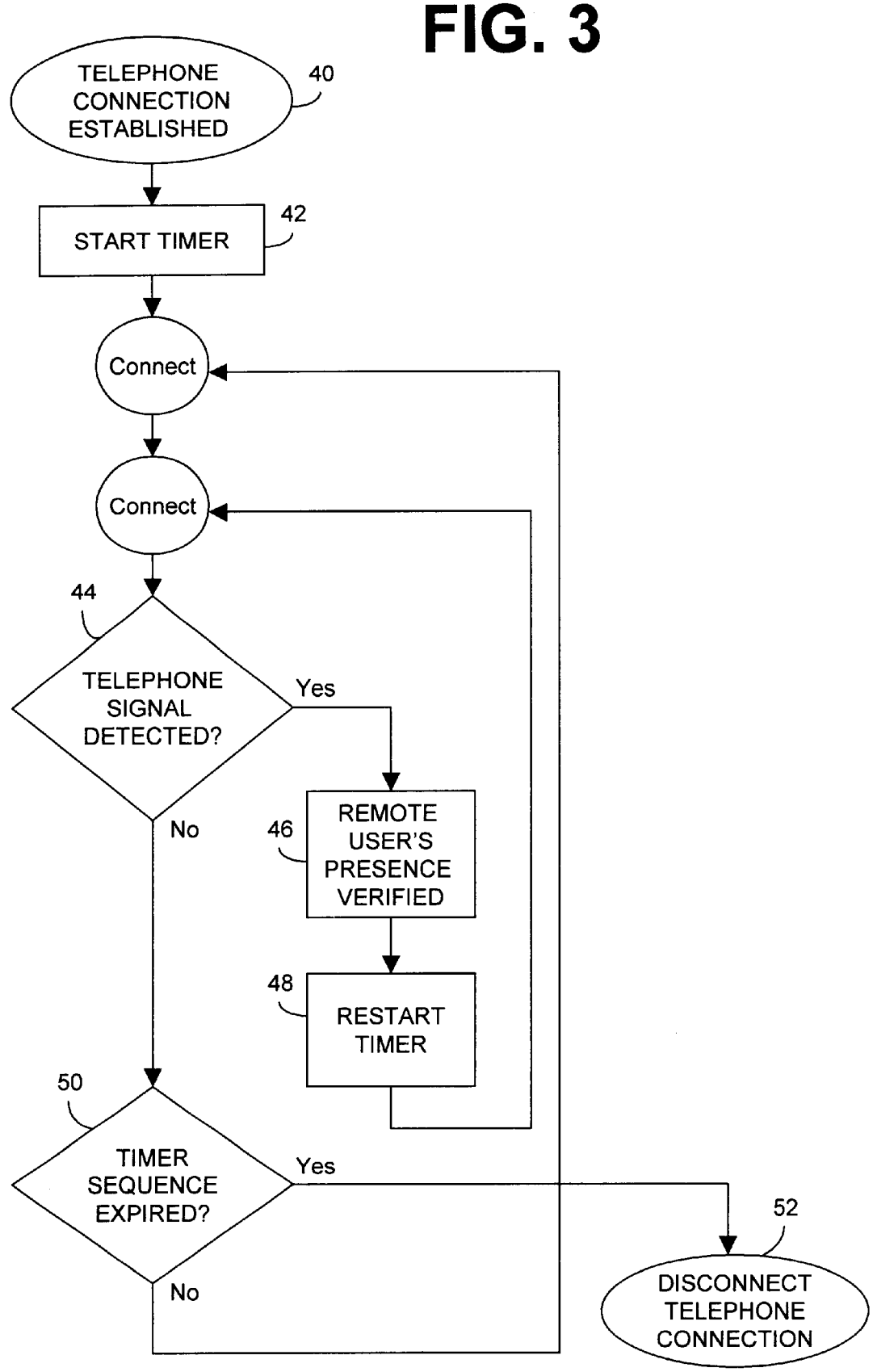
FIG. 3 is a flow chart which illustrates one embodiment of the operation of a telephone answering apparatus in accordance with the invention.

FIG. 3 illustrates one example of the operation of the telephone answering apparatus 12 in accordance with the invention. Reference is made to both FIGS. 1 and 3 in the following discussion. Block 40 represents establishment of a telephone connection between the remote user 10 and telephone answering apparatus 12 via the GSTN 14. Block 42 represents initiation of a timer sequence by the timer 30. The timer sequence provides a period of time for the detector 28 to detect a telephone signal generated by remote user 10. As shown in Blocks 44, 46, 48, and 50, if the detector 28 detects a telephone signal from the remote user 10 before the timer sequence expires, the presence of the remote user 10 is verified and the controller 26 restarts the timer 30.

Figure 4:
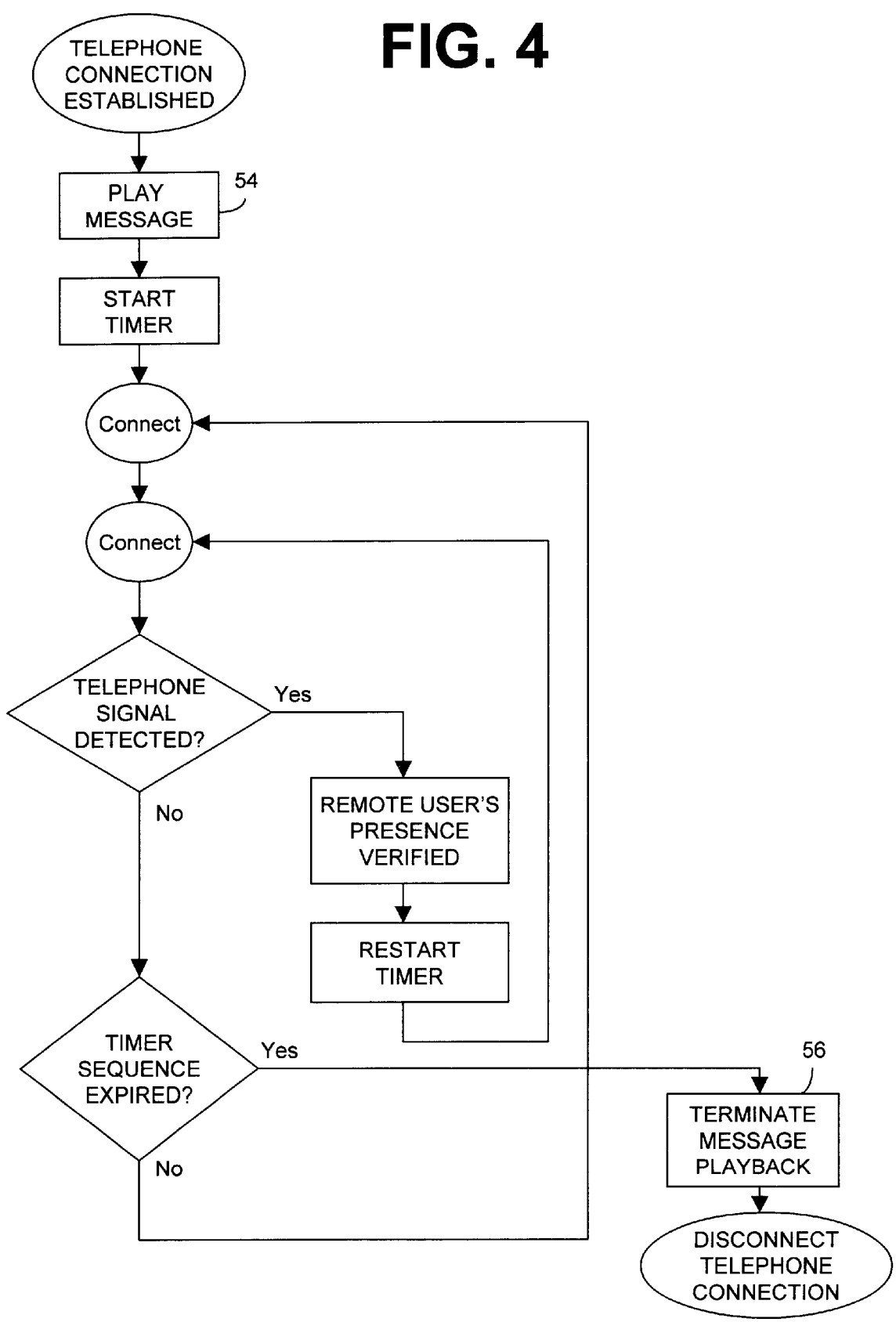
FIG. 4 is a flow chart which illustrates an alternative embodiment of the operation of a telephone answering apparatus in accordance with the invention.

FIG. 4 illustrates another example of the operation of the telephone answering apparatus 12 wherein remote user 10 initiates the playback of a message. FIG. 4 illustrates the same operation as shown in FIG. 3 with the addition of two steps. In particular, as shown in FIG. 4, Block 54 represents the playing of a message in response to an instruction initiated by the remote user 10 after the timer sequence has been initiated. Block 56 represents the termination of message playback after the timer sequence expires.

An advantage of the telephone answering apparatus 12 is that it ensures that a telephone line connection that is not in use will be disconnected automatically within a short period of time after the remote user 10 becomes inactive or hangs up. This may reduce the remote user's telephone charges and may result in a more efficient use of a finite number of telephone lines by terminating the telephone connection soon after the remote user becomes inactive or hangs up. Another advantage of the invention is that it may enable the telephone answering apparatus 12 to pass Post Telephone and Telegraph (PTT) approval testing in countries which require active participation of the remote user 10 while the remote user 10 is connected to the telephone answering apparatus 12.

The telephone answering apparatus 12 may be used in a wide variety of automatic telephone answering systems including, for example, automatic telephone message recording equipment, automatic telephone call forwarding equipment, automatic dial-up alarm receiving equipment, and automatic answering data entry systems. It is contemplated that the telephone answering apparatus 12 may be used in wide variety of other types of telephone answering systems.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of verifying the presence of a remote user during playback of a message for the remote user stored on a telephone answering apparatus comprising:

providing a timer, a detector, and a controller;

establishing a telephone connection between a remote user and the telephone answering apparatus;

initiating a timer sequence in response to initiating the playback of the message;

detecting at least one telephone signal inputted by the remote user during the playback of the message stored on the telephone answering apparatus;

restarting the timer sequence in response to the detection of the at least one telephone signal to prevent terminating the playback of the message;

ending the timer sequence;

terminating the playback of the message; and terminating the telephone connection between the remote user and the telephone answering apparatus.

2. A method of verifying the presence of a remote user during playback of a message for the remote user stored on a telephone answering apparatus comprising:

providing a timer, a detector, an audio player, and a controller;

establishing a telephone line connection between a remote user and the telephone answering apparatus;

playing the message stored on the telephone answering apparatus and initiating a timer sequence in response to playing the message;

detecting at least one telephone signal inputted by the remote user during playback of the message stored on the telephone answering apparatus;

restarting the timer sequence in response to the detection of the at least one telephone signal to prevent terminating the playback of the message;

ending the timer sequence;

stopping the playing of the message; and terminating the telephone connection between the remote user and the telephone answering apparatus.

3. The apparatus of claim 2 wherein the telephone signal comprises a Dual Tone Multi Frequency signal.

4. A telephone answering apparatus for verification of the presence of a remote user during playback of a message for the remote user stored on the telephone answering apparatus comprising:

a detector, and a controller operatively connected to the detector and to a timer, wherein the controller initiates a timer sequence in response to an initial playback of the message and restarts the timer upon detection of a telephone signal inputted by the remote user during the playback of the message stored on the telephone answering apparatus to prevent terminating the playback of the message and wherein the controller terminates the playback of the message and disconnects a telephone connection between the remote user and the telephone answering apparatus if the telephone signal is not detected within a set period of time.

5. The apparatus of claim 4 wherein the telephone signal comprises an audio signal.

6. The apparatus of claim 6 wherein the audio signal comprises a Dual Tone Multi Frequency signal.

7. The apparatus of claim 4 wherein the detector is a telephone signal detector.

8. The apparatus of claim 4 further comprising an audio player operatively connected to the controller.

9. The apparatus of claim 4 further comprising a 2-wire to 4-wire network circuit is operatively connected to the detector.

10. The apparatus of claim 9 further comprising a switch operatively connected to the 2-wire to 4-wire network circuit.

11. The apparatus of claim 4 wherein the telephone signal comprises a Dual Tone Multi Frequency signal.

* * * * *